United States Patent
Morimasa et al.

[11] Patent Number: 5,804,720
[45] Date of Patent: Sep. 8, 1998

[54] FLOW SENSOR APPARATUS INCLUDING A THIN FILM SENSOR

[75] Inventors: Kaminishi Morimasa, Shiroishi; Kimura Mitsuteru, Miyagi-gun, both of Japan

[73] Assignee: Ricoh Company, Ltd., Tokyo, Japan

[21] Appl. No.: 708,851

[22] Filed: Sep. 9, 1996

[30] Foreign Application Priority Data

Sep. 7, 1995 [JP] Japan ................................. 7-229734

[51] Int. Cl.$^6$ .................................................. G01F 1/68
[52] U.S. Cl. ...................................... 73/204.26; 73/202.5
[58] Field of Search ........................... 73/204.11, 204.16, 73/204.23, 204.24, 204.25, 204.26, 202.5

[56] References Cited

U.S. PATENT DOCUMENTS

| | | | |
|---|---|---|---|
| 4,478,076 | 10/1984 | Bohrer | 73/204.26 X |
| 4,478,077 | 10/1984 | Bohrer | 73/204.26 X |
| 4,501,144 | 2/1985 | Higashi et al. | 73/204.26 |
| 4,581,928 | 4/1986 | Johnson | 73/204.26 |
| 4,624,137 | 11/1986 | Johnson et al. | 73/204.26 |
| 4,682,503 | 7/1987 | Higashi et al. | 73/204.26 X |
| 4,696,188 | 9/1987 | Higashi | 73/204.26 X |
| 4,739,657 | 4/1988 | Higashi et al. | 73/204.26 X |
| 4,914,947 | 4/1990 | Davidson | 73/202.5 |
| 5,050,429 | 9/1991 | Nishimoto et al. | 73/204.26 |
| 5,291,781 | 3/1994 | Nagata et al. | 73/204.26 |
| 5,313,832 | 5/1994 | Stephan et al. | 73/204.26 |
| 5,392,647 | 2/1995 | Manaka | 73/204.26 |
| 5,452,610 | 9/1995 | Kleinhans et al. | 73/204.26 |
| 5,464,966 | 11/1995 | Gaitan et al. | 73/204.26 X |
| 5,467,649 | 11/1995 | Reihlen et al. | 73/204.26 |

FOREIGN PATENT DOCUMENTS

| | | | |
|---|---|---|---|
| 2-259527 | 10/1990 | Japan | 73/204.26 |
| 4-69521 | 3/1992 | Japan | 73/204.26 |
| 4-93768 | 3/1992 | Japan | 73/204.26 |
| 2 240 627 | 8/1991 | United Kingdom | 73/204.26 |

*Primary Examiner*—Elizabeth L. Dougherty
*Assistant Examiner*—Paul D. Amrozowicz
*Attorney, Agent, or Firm*—Oblon, Spivak, McClelland, Maier & Neustadt, P.C.

[57] ABSTRACT

The bridge-like thin film sensor 5 is frangible as thin and bridge-like form suspended over the hollow 3. In case that a pieces of dust hits it, it is often broken.

In view of the foregoing drawbacks in the background flow sensor, one object of the present invention to provide a novel flow sensor which hard to break by a pieces of dust.

In accordance with the present invention, this object of the present invention is attained by a novel flow sensor which includes a substrate installed in the fluid path; a hollow formed on a surface of the substrate; a thin film sensor portion suspended over the hollow; and a guard portion near of the hollow; wherein the width of seid sensor portion is formed being not destructed by a pieces pieces of dust having the about same width of said sensor portion when the pieces of dust collides with said sensor portion.

16 Claims, 7 Drawing Sheets

FLOW SENSOR APPARATUS INCLUDING A THIN FILM SENSOR

BACKGROUND OF THE INVENTION

1. Field of the Invention

The present invention relates to a flow sensor installed in a fluid path for measuring a physical property of a fluid, i.e. a gas or a liquid, flowing through the fluid path, and more particularly to a thermal-type flow sensor formed on a substrate which is used to control and measure a flow velocity or flow volume of a gas flow or liquid flow.

2. Discussion of the Background

Various types of sensors for measuring various physical properties, e.g. a flow velocity or a flow volume, of a gas flow or a liquid flow are known, including one in which a thermal-type flow sensor is formed a substrate.

Figure 1:
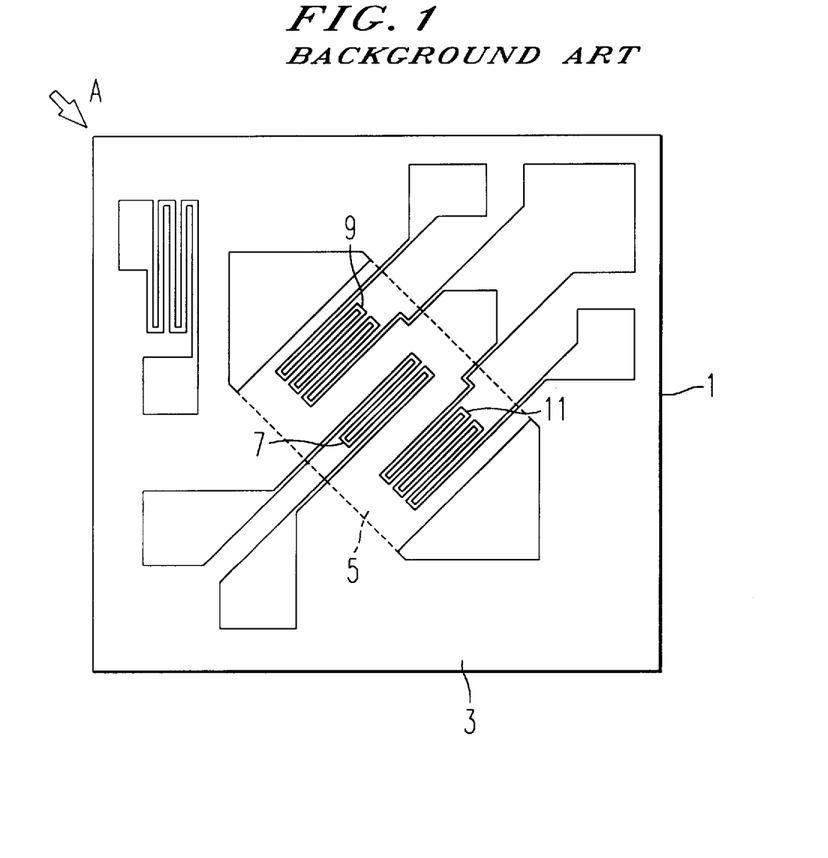
FIG. 1 is an elevational view showing a background thermal-type gas flow sensor formed on a substrate.

FIG. 1 shows an example of a background thermal-type gas flow sensor formed on a substrate as disclosed in Japanese Laid-Open Patent Application (KOKAI) 5-157603.

A bridge-like thin film sensor 5 is suspended over a hollow 3 of a square semiconductor substrate 1. An upstream-side temperature sensing portion 9 and a downstream-side temperature sensing portion 11 constructed with an electric resistor are formed on the bridge-like thin film sensor 5. A heater 8 constructed with an electric resistor is formed between these sensing portions 9,11 on the bridge-like thin film sensor 5. If the gas does not flow in the flow direction A, the upstream-side sensing portion 9 is heated the same as the downstream-side sensing portion 11 by the heater 8. However, if the gas flows in the direction A, the upstream-side sensing portion 9 is heated less than the downstream-side sensing portion 11 by the warm gas heated by the heater 8. As resistance values of these sensing portions 9, 11 vary due to the temperature variation, a flow velocity or flow volume of the gas can be measured by the difference in resistance between these sensing portions 9, 11.

Figure 2:
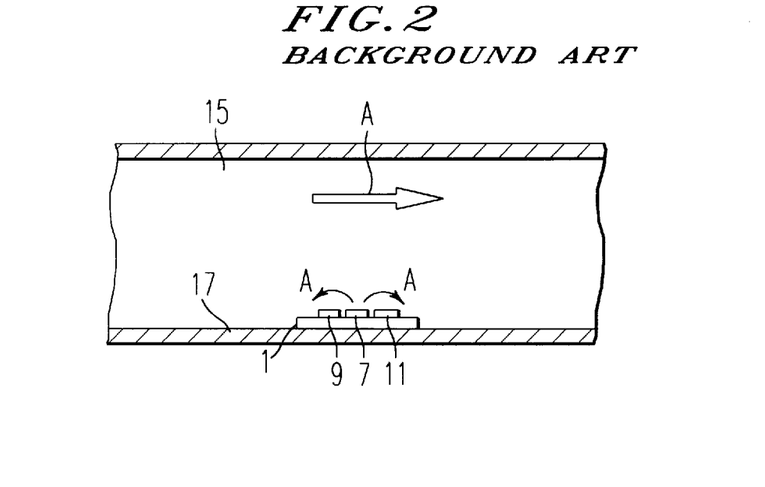
FIG. 2 is a sectional side view showing a tube as a fluid path and the substrate of the thermal-type gas flow sensor installed in the tube.

FIG. 2 is sectional side view showing a tube 15 as a fluid path and the substrate 1 of the thermal-type gas flow sensor installed on an inner wall of the tube 15.

The bridge-like thin film sensor 5 is frangible since it is a thin bridge-like form suspended over the hollow 3. If a piece of dust hits it, it is often broken.

SUMMARY OF THE INVENTION

In view of the foregoing drawbacks in the background flow sensor, one object of the present invention to provide a novel flow sensor which is hard to break by pieces of dust.

In accordance with the present invention, the object of the present invention is attained by a novel flow sensor which includes a substrate installed in the fluid path; a hollow formed in a surface of the substrate; a thin film sensor portion suspended over the hollow; and a guard portion near the hollow; wherein the width of said sensor portion is formed so as not to be destroyed by pieces of dust having the same width as said sensor portion when they collide with said sensor portion.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
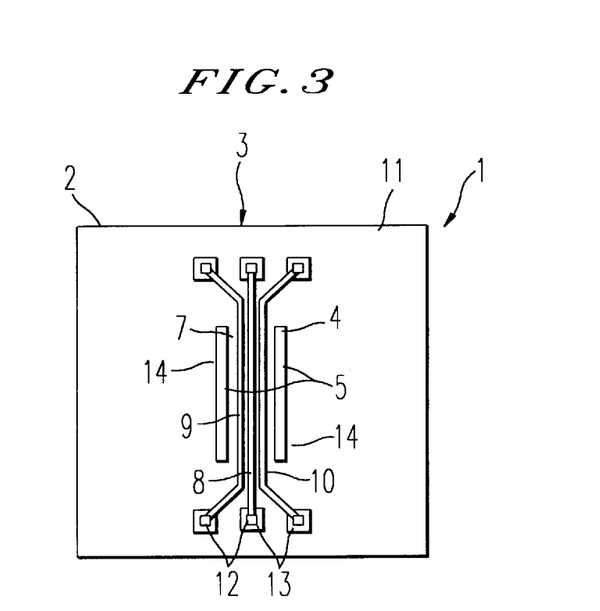
FIG. 3 shows a first embodiment of the present invention.

Referring now to the drawings, wherein like reference numerals designate identical or corresponding parts throughout the several views, and more particularly to FIG. 3 thereof, one embodiment of the present invention is now described in further detail.

The first example of a flow sensor 1 is a microsensor which has a substrate 2 made of photosensitive glass. A sensor portion 3 formed of a narrow long thin film is formed on the substrate. A hollow 4 is formed beneath the sensor portion 3 with the hollow having a mouth 5 extending to the surface on either side of the sensor portion 3. The hollow 4 then forms a tunnel in the direction of the fluid flow (not illustrated). Accordingly, the sensor portion 3 including the bridge structure crosses the fluid flow direction at right angles.

Figure 4:
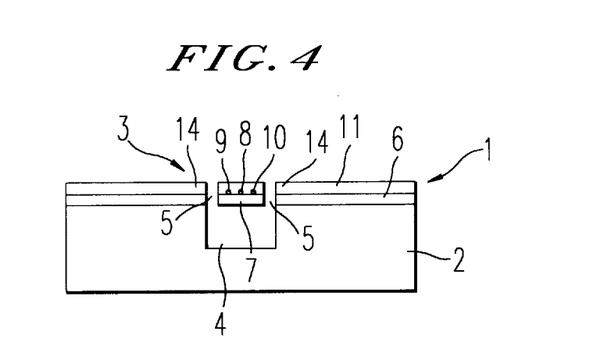
FIG. 4 is sectional side view of the embodiment shown in FIG. 3.

$SiO_2$ and $Ta_2O_5$ can be used to form the support portion 7 of the bridge structure. An insulation layer 6 covers the substrate and other portions of the sensor. The resistance heater 8 and the resistance sensors 9 and 10 are formed on the support portion of the bridge. A protection layer 11 covers the entire sensor including the bridge resistors and insulation layer. The resistance heater and the resistance sensors are arranged along the length of the bridge and thus are at right angles to the fluid flow direction. The heater is placed between the two sensors. Electrodes 12 are formed at each end of resistors 8–10. An opening 13 in the protection layer 11 is formed in order to connect the electrodes to sensing circuits (not shown).

In the design of the sensor portion 3, the actual environment of use of the sensor is considered so that the sensor portion will not be destroyed by pieces of dust having the same width as the sensor when they collide. Similarly, the sensor should be designed to avoid damage from grain lumps having the same diameter as the width of the sensor. First, the environment in which the flow sensor is used, is determined in terms of the velocity of the fluid flow and the size and specific gravity of grain lumps which can be expected to flow in this fluid flow.

The energy of the grain lump which collides with the sensor portion 3 is proportional to its mass. The mass is proportional to the cube of its diameter. On the other hand, for a given thickness and length of material, the strength of a sensor portion is proportional to the width. In the situation where the diameter of the grain lumps is the same as the width of the sensor, a fixed critical value is determined above which the sensor portion is not destroyed by a collision with a grain lump. The sensor portions are designed to have at least this width.

As mentioned above, the hollow 4 has a mouth 5 which opens on either side of the sensor portion 3. The mouth openings are parallel to the sensor portion and are formed by narrow long slits. A guard portion 14 is formed by the substrate and other layers formed thereon which are located next to the mouth openings.

Using this configuration, the flow sensor may be arranged inside an air-conditioning duct in order to measure the flow of air therein. In order to measure the flow, the resistance heater 8 which generates heat and the ratio of the resistance sensors 9 and 10 are determined by the application of a voltage.

If the air around the sensor is not flowing, the two resistance sensors 9 and 10 see the same amount of heat from heater 8. This is true because there is no air flow to carry the heat in either direction. Since the ratio of the two resistance values does not change, the volume and velocity of the flow is detected to be "0" by a detection circuit.

On the other hand, if fluid does flow, the resistance sensor 9 is cooled by fluid that flows in from the outside while resistance sensor 10 is heated by the fluid which is heated by resistance heater 8. Therefore, a temperature difference occurs which corresponds to the fluid flow. The ratio of the two resistances indicates the temperature difference and thus the volume and velocity of the flow.

When the flow sensor 1 is arranged in a fluid flow, grain lumps floating in the fluid may collide with the sensor portion 3. However, since the sensor portions are designed to have a sufficiently small width, a grain lump having the same diameter does not cause the destruction of the sensor when they collide. If a grain lump has a larger diameter than the sensor width, the grain lump also collides with the guard portion 14 which receives part of the energy from the collision, thus avoiding the destruction of the sensor portion 3.

Thus, these sensors have good endurance and are not destroyed even though grain lumps of various sizes collide with the sensor portions in use. Although individual parts of the sensor, such as the hollow 4, the mouth 5 and the guard portion 14 help to make the structure strong, the individual parts are not individually necessary.

The method of manufacturing the flow sensor will now be explained. The substrate plate 2 which is made from photosensitive glass is exposed with a pattern to form hollows 4. An insulation layer 6 formed from $SiO_2$ and a metal thin film is made by spattering. The metal thin film is subjected to photolithography and etching in order to form the resistance heater 8 and resistance sensors 9 and 10. The insulation layer 6 is also subjected to photolithography and anisotropy etching to form the support portion shapes 7. As the substrate 2 is exposed to form the mouth opening shapes, anisotropic etching forms hollow 4 on the back side of the support portion.

Although the flow sensor has been described as a microsensor, it is not limited strictly to measuring the amount of flow as described. It is also possible to use a device to form a gas sensor or a humidity sensor with such a structure.

Figure 5:
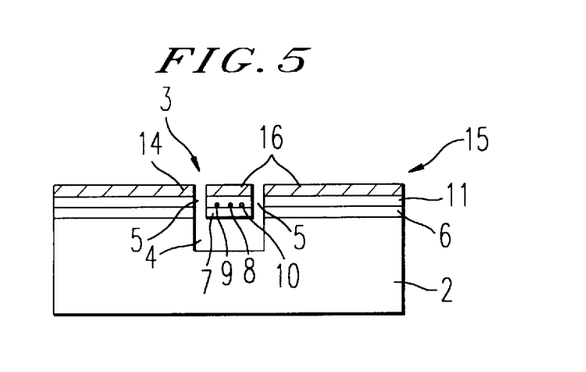
FIG. 5 shows a modification of the embodiment shown in FIG. 3.

FIG. 5 shows a modification of the first embodiment of the invention which increases the strength of the sensor portion. Flow sensor 15 includes, in addition to the elements described in FIG. 1, a reinforcement membrane 16 which overlays the top surface of the sensor. The membrane may be made of polyimid which requires temperatures of around 100° C. The membrane 16 may be strong enough to avoid the necessity for having a protection layer 11. While it is desirable that membrane 16 is formed by a metal, the higher temperature involved would require the insulation of the protection layer 11.

Figure 6:
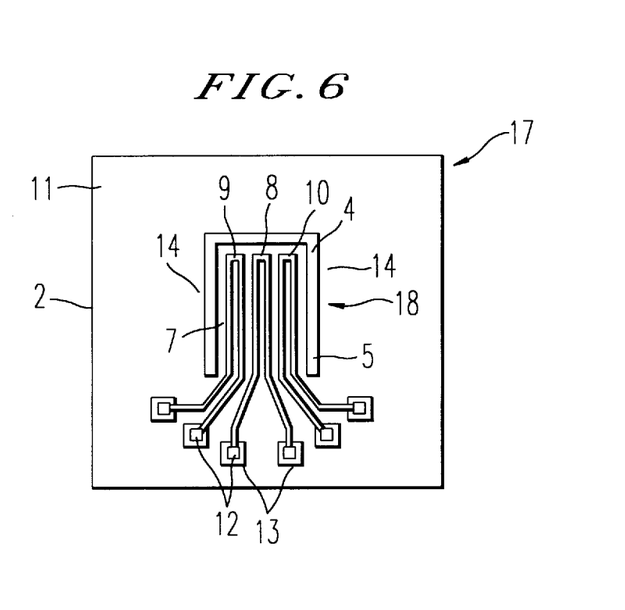
FIG. 6 shows another modification of the embodiment shown in FIG. 3.

Although the example given in FIG. 3 shows that the sensor portion is a narrow long thin film formed by a bridge, FIG. 6 shows another modification where the flow sensor 17 uses a sensor portion 18 formed as a beam structure with mouth openings around three sides.

Figure 7:
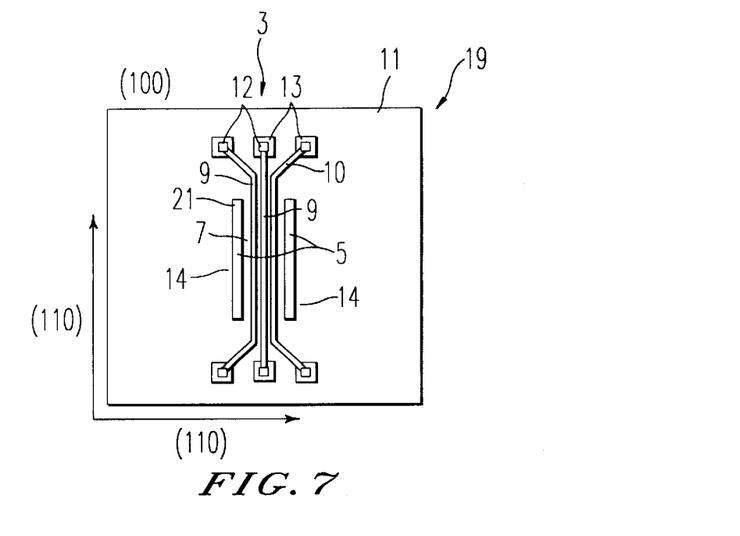
FIG. 7 shows yet another modification of the embodiment shown in FIG. 3.

FIG. 7 shows another modification of the first embodiment of the invention with a flow sensor 19 formed as a microsensor using a substrate 20. Furthermore, it is possible to use monocrystalline silicon to form a monocrystalline body. Although monocrystalline silicon has a crystal mask of (100) (110) (111), the progressive speed of etching against these crystal masks is for Riezon of "(100)>(110)>>(111)". Thus, if the directions of the crystal mask of the substrate 20 of monocrystalline silicon is properly chosen as shown in FIG. 7, the formation of the cavity 21 is simplified when formed by anisotropic etching as shown in FIG. 8.

Figure 8A:
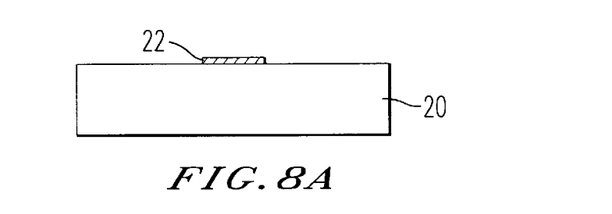
FIG. 8(a), FIG. 8(b) and FIG. 8(c) show another modification of the embodiment shown in FIG. 3.
Figure 8B:
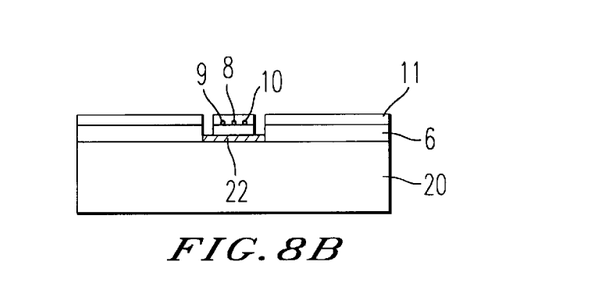

A method of manufacturing such a flow sensor 19 is described below based on FIG. 8. First, the substrate 20 of monocrystalline silicon is arranged as shown in Figure 7 so that the (100) mask is located on the surface and a metal thin film of aluminum is deposited by spattering on the surface. Using photolithography and etching, a pattern may be made in the metal thin film, as shown in FIG. 8a, with thin film layer 22 shaped like a rectangle formed on the <110> axes of the substrate 20. As shown in FIG. 8b, an insulation layer 6 is formed on the substrate and on the thin film layer. A metal thin film is then made into a pattern on top of the insulation layer in order to form the resistance heater 8 and resistance sensors 9 and 10. Protection layer 11 covers the insulation layer and the resistances.

Figure 8C:
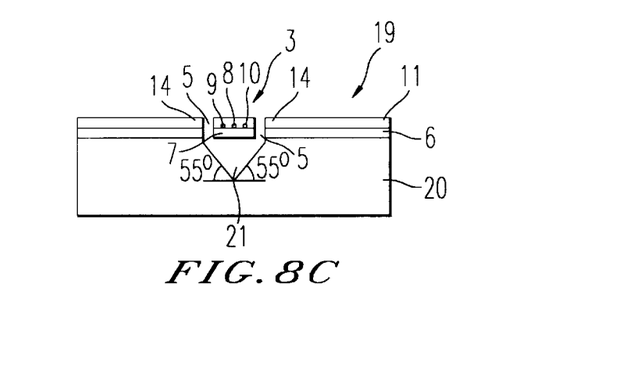

Using anisotropic etching with KOH solvent, the thin film layer 22 is dissolved as shown in FIG. 8c. A cavity 21 is then also formed in the substrate of monocrystalline silicon. The cavity 21 has sides formed as the (111) mask of monocrystalline silicon and thus are inclined at 54.7° to the surface of the substrate.

When the flow sensors are manufactured in this manner, errors in the product can be reformed and the cavity can be made into an exact shape. Furthermore, since no special equipment is needed for this manufacture, the productivity of the flow sensors can be improved.

Figure 9:
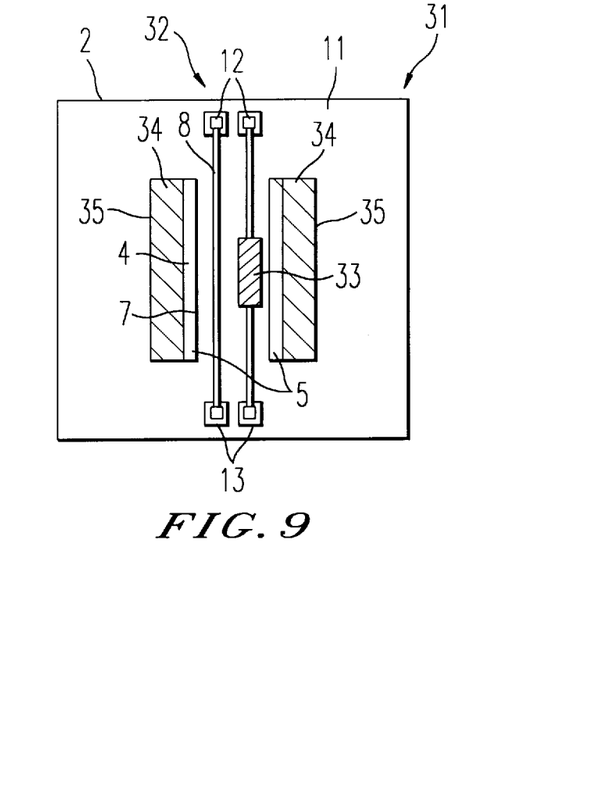
FIG. 9 shows a second embodiment of the present invention.

The second embodiment of the invention is shown in FIGS. 8 and 9. Similar parts of this embodiment use the same reference numerals as the embodiment of FIG. 3. These parts are not described herein to avoid duplication.

The gas sensor 31 has a sensor portion 32 carrying a gas detection body 33 and a resistance heater 8. The gas detection body 33 is located on the surface of the protection layer 11 and thus is exposed to damage from the outside.

Figure 10:
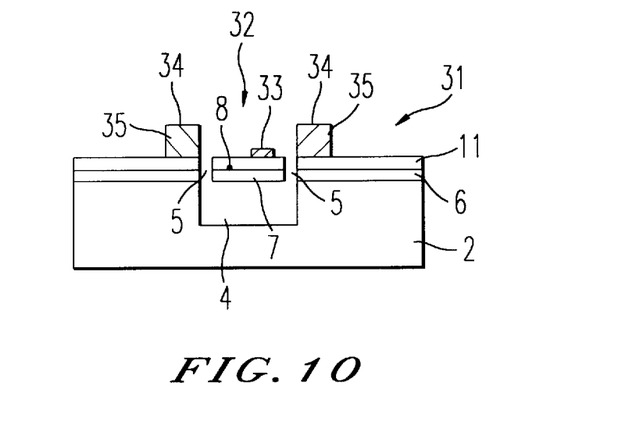
FIG. 10 is sectional side view of the embodiment shown in FIG. 9.

In designing the gas sensor, the environment of use of the sensor portion and the size of the grain lump which is liable to collide with the sensor portion is determined. The width of the sensor portion is designed to avoid destruction upon such collision. On each side of the sensor portion 32 is formed a mouth 5 opened to a hollow 4. A guard portion 34 is formed on the top of the substrate, insulating layer and protection layer. These guard portions are formed by a thick film of photoresist 35. FIGS. 9 and 10 show that the membrane 35 is located next to the mouth openings and have the same length.

Using this configuration, the gas sensor can be placed near a gas pipe in order to check for gas leaks. In order to check for a gas leak, the gas detection body 33 is heated by the resistance heater 8. The resistance of the gas detection body 33 is then observed to watch for a change. Since the gas mixes in this condition, the gas detection body becomes heated and the tin oxidized due to absorption of the gas. As a result the electrical resistance of the gas body changes and thus indicates the presence of gas.

When the gas sensor is used to detect gas or other parameters, a grain lump may float in the fluid and collide with the sensor portion 32. However, since the sensor portion is formed with sufficiently small width, a grain lump having the same diameter as the width of the sensor causes destruction even if it collides with the sensor. Such a grain lump collides with the projecting guard portion 34 and thus does not collide with the sensor portion 32. Thus, the sensor portion avoids destruction.

Thus, the endurance of such a gas sensor is good even when grain lumps of various sizes collide with the sensor in use. When the grain lumps have a large diameter, the sensor has especially good endurance since it cannot touch the sensor portion 32.

Although in the above example the gas sensor is used as a microsensor, it is also possible to use it as a flow sensor or a humidity sensor. It is possible to strengthen the gas sensor portion 32 by adding a membrane of reinforcement to its surface. Also, although the sensor portion is shown as being a narrow long thin membrane formed in a bridge structure, it is also possible for it to take the form of a beam structure in similar fashion to the modification to the first embodiment shown in FIG. 6. Also, in a similar fashion to the modification of the first embodiment shown in FIG. 7, it is possible that gas sensor 31 may be made into a monocrystailine body using monocrystalline silicon.

Figure 11:
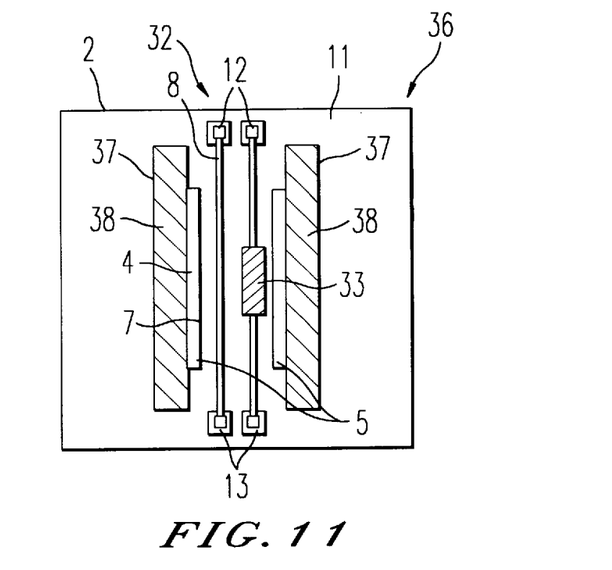
FIG. 11 shows a modification of the embodiment shown in FIG. 9.

In regard to FIG. 11, a gas sensor 36 is shown having guard portions 38 placed on the upper side of the thick film 37. A guard portion may be extended at both ends to be longer than the window openings. As a result the sensor portion is protected more completely due to its extra length. This is especially true for the connection portion of the sensor portion 32 and the substrate. The protection of both ends by the guard portion 38 helps to avoid the possibility that a crack can occur by collision with a grain lump.

Figure 12:
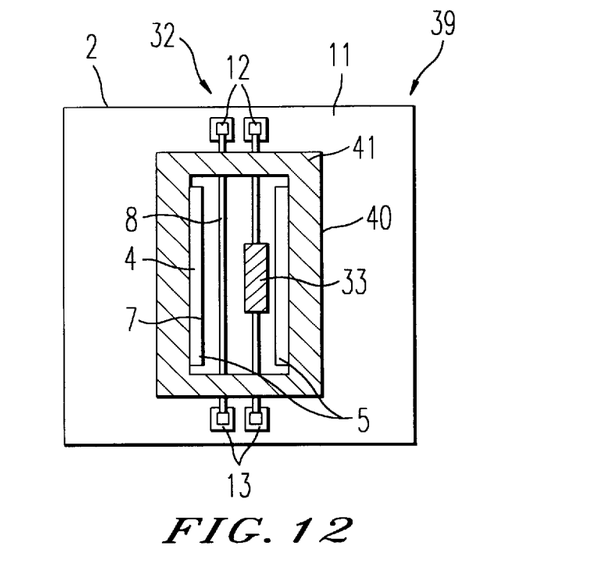
FIG. 12 shows another modification of the embodiment shown in FIG. 9.

FIG. 12 shows a further embodiment where the guard portion 41 which is formed on the upper side of the Atsushi membrane 40 is formed into a loop. Thus, the two sections formed in the length direction now have their ends joined by the additional width sections. This arrangement helps to protect the sensor portion more satisfactorily since it is surrounded in all directions and thus can better prevent damage.

Figure 13:
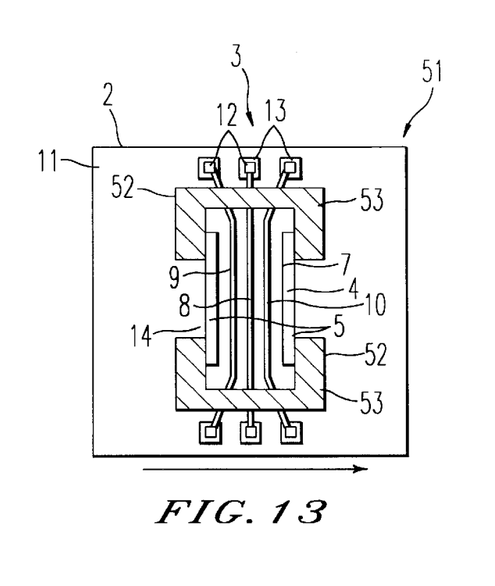
FIG. 13 shows yet another modification of the embodiment shown in FIG. 9.

A third embodiment of the invention is shown in FIG. 13. The flow sensor 51 is used as a microsensor and has a guard portion 14 formed on either side of the sensor portion 3. The guard portion 53 is formed around both ends of the sensor portion 3 by thick film 52.

In this configuration, the central part of the sensor portion is protected by the guard portions 14 and the ends are protected by the thick film guard portion.

The guard portion 53 prevents problems with the substrate since it stands out above the surface. The fluid satisfactorily flows through the sensor portion to determine the volume of flow. The thick film guard portion is not located on the sides of the central part of the sensor portion so that fluid flow may be detected satisfactorily.

Figure 14:
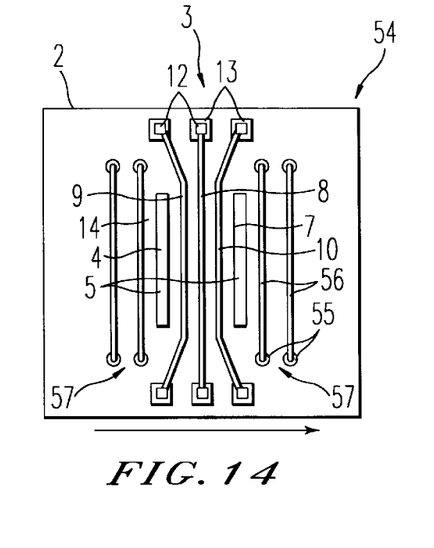
FIG. 14 shows a third embodiment of the present invention.
Figure 15:
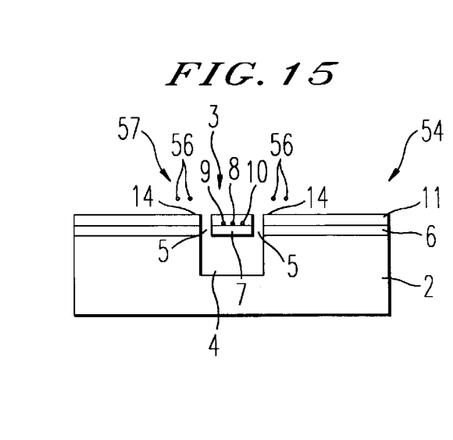
FIG. 15 is sectional side view of the embodiment shown in FIG. 14.

FIGS. 14 and 15 show a flow sensor which is a microsensor. Bonding pads 55 are placed on both sides of the sensor portion at both ends. Bonding wires 56 extend in the length direction between the bonding pads. The wires extend above the surface of the sensor portion and thus do not interfere with the fluid flow.

This arrangement does not completely remove the possibility of a collision with a grain lump of large diameter since the strength of the bonding wire is not great. However, the sensor portion is also protected by the two guard portions 14.

Furthermore, the sensor portion with bonding pad 55 and electrode 12 can be formed with the same equipment and the bonding wires 56 can be built simultaneously with the electrode wiring 12. Accordingly, the productivity of manufacture of such flow sensors is good.

What is claimed as new and is desired to be secured by Letters Patent of the United States is:

1. A flow sensor apparatus for measuring a physical property of a fluid flowing through a fluid path, comprising:
   a substrate installed in the fluid path;
   a hollow formed in a surface of the substrate;
   a thin film sensor portion suspended over the hollow; and
   a guard portion formed on the substrate near the hollow;
   wherein the width of said sensor portion is formed so as not to be destroyed by pieces of dust having about the same width as said sensor portion when the pieces of dust collide with said sensor portion.

2. A flow sensor apparatus for measuring physical property of fluid flowing through a fluid path according to claim 1, wherein said substrate is monocrystalline.

3. A flow sensor apparatus for measuring physical property of fluid flowing through a fluid path according to claim 1, wherein a mouth of said hollow is formed as a slit.

4. A flow sensor apparatus for measuring physical property of fluid flowing through a fluid path according to claim 1, wherein a height of said guard portion is higher than a height of said sensor portion.

5. A flow sensor apparatus for measuring physical property of fluid flowing through a fluid path according to claim 1, wherein a length of said guard portion is longer than a length of said mouth of said hollow.

6. A flow sensor apparatus for measuring physical property of fluid flowing through a fluid path according to claim 1, wherein a surface of said sensor portion is covered by a thin layer for reinforcement.

7. A flow sensor apparatus for measuring physical property of fluid flowing through a fluid path according to claim 2, wherein a mouth of said hollow is formed as a slit.

8. A flow sensor apparatus for measuring physical property of fluid flowing through a fluid path according to claim 2, wherein a height of said guard portion is higher than a height of said sensor portion.

9. A flow sensor apparatus for measuring physical property of fluid flowing through a fluid path according to claim 3, wherein a height of said guard portion is higher than a height of said sensor portion.

10. A flow sensor apparatus for measuring physical property of fluid flowing through a fluid path according to claim 2, wherein a length of said guard portion is longer than a length of said mouth of said hollow.

11. A flow sensor apparatus for measuring physical property of fluid flowing through a fluid path according to claim 3, wherein a length of said guard portion is longer than a length of said mouth of said hollow.

12. A flow sensor apparatus for measuring physical property of fluid flowing through a fluid path according to claim 4, wherein a length of said guard portion is longer than a length of said mouth of said hollow.

13. A flow sensor apparatus for measuring physical property of fluid flowing through a fluid path according to claim 2, wherein a surface of said sensor portion is covered by a thin layer for reinforcement.

14. A flow sensor apparatus for measuring physical property of fluid flowing through a fluid path according to claim 3, wherein a surface of said sensor portion is covered by a thin layer for reinforcement.

15. A flow sensor apparatus for measuring physical property of fluid flowing through a fluid path according to claim 4, wherein a surface of said sensor portion is covered by a thin layer for reinforcement.

16. A flow sensor apparatus for measuring physical property of fluid flowing through a fluid path according to claim 5, wherein a surface of said sensor portion is covered by a thin layer for reinforcement.

* * * * *